(12) United States Patent
Hashizume

(10) Patent No.: US 7,027,798 B2
(45) Date of Patent: Apr. 11, 2006

(54) ELECTRONIC TERMINAL HAVING AN EMERGENCY MESSAGE FUNCTION AND INSURANCE SYSTEM USING THE SAME

(75) Inventor: Kenichi Hashizume, Gunma-ken (JP)

(73) Assignee: Nokia Corporation, Espoo (FI)

( * ) Notice: Subject to any disclaimer, the term of this patent is extended or adjusted under 35 U.S.C. 154(b) by 118 days.

(21) Appl. No.: 10/327,674

(22) Filed: Dec. 20, 2002

(65) Prior Publication Data
US 2004/0203571 A1 Oct. 14, 2004

(30) Foreign Application Priority Data
Dec. 26, 2001 (JP) ......................... 2001-395325

(51) Int. Cl.
H04M 11/04 (2006.01)
H04M 11/00 (2006.01)
G06F 17/30 (2006.01)
G06F 13/28 (2006.01)

(52) U.S. Cl. ................. 455/404.1; 379/93.17; 379/88.2; 343/873; 343/795; 343/700; 707/1; 707/3; 707/6; 711/157; 711/158

(58) Field of Classification Search ............. 455/404.1, 455/556.1, 80, 82, 575.1, 567, 128; 379/1.01, 379/33, 38, 37, 47, 188, 93.17, 88.2; 340/870.09, 340/825.56, 506, 571
See application file for complete search history.

(56) References Cited

U.S. PATENT DOCUMENTS

| 5,483,678 | A | * | 1/1996 | Abe ............................. 455/80 |
| 5,761,732 | A | * | 6/1998 | Shaberman et al. ......... 711/157 |
| 5,918,180 | A | * | 6/1999 | Dimino .................... 455/456.3 |
| 6,111,552 | A | * | 8/2000 | Gasser ....................... 343/873 |
| 6,370,519 | B1 | * | 4/2002 | Kim .............................. 707/1 |

* cited by examiner

Primary Examiner—William Trost
Assistant Examiner—Kiet Doan

(57) ABSTRACT

An electronic terminal having an emergency message function which can be easily used little inducing erroneous operation or operation out of fun. The electronic terminal comprises a predetermined breakable portion that can be intentionally broken by a user, break detector means for detecting the breakage of the breakable portion, first storage means storing predetermined data related to a place to be accessed, second storage means storing predetermined emergency data, radio communication means for connection to a network in a wireless manner, and emergency message means in which the break detector means detects the breakage when the breakable portion is intentionally broken by the user, the data related to a place to be accessed is read out from the first storage means, the emergency data is read out from the second storage means, and the emergency data is transmitted by the radio communication means to the place to be accessed.

12 Claims, 4 Drawing Sheets

ELECTRONIC TERMINAL HAVING AN EMERGENCY MESSAGE FUNCTION AND INSURANCE SYSTEM USING THE SAME

CROSS-REFERENCE TO RELATED APPLICATION

The present invention claims the priority of Japanese application 2001-395325, filed on Dec. 26, 2001.

BACKGROUND OF THE INVENTION

1. Field of the Invention

This invention relates to an electronic terminal having an emergency message function. More specifically, the invention relates to an electronic terminal capable of generating an emergency message upon intentionally breaking part of the electronic terminal.

The invention further relates to an insurance system using the electronic terminal having the emergency message function and, more particularly, to an insurance system for compensating the electronic terminal that was broken in an attempt to use the emergency message function.

2. Description of the Related Art

An electronic terminal such as a mobile telephone has a communication function, carried by the user at all times, and is useful as a method of communication in an emergency. In the emergency, however, it is considered that the user may not have an ample time for executing a suitable operation. It would therefore be convenient if the user in an emergency case is allowed to make a communication with police or the like organ through a simple method. The idea of this kind has been realized by a number of technologies. For example, a cell phone capable of calling police upon depressing a predetermined button has been disclosed in JP-A-No. 2000-217158. Similarly, a cell phone that emits SOS signals upon depressing a particular button has been disclosed in JP-A-No. 2001-95045.

However, if an emergency message is generated upon depressing a single button as described above, there arouses a problem of increased chances of emitting emergency message due to erroneous operation. For example, a button that is provided for emergency message may be depressed accidentally in a pocket or in a bag to generate undesired emergency message. Further, if the emergency message can be issued through a simple operation, it becomes likely that the emergency message is issued out of fun.

SUMMARY OF THE INVENTION

The electronic terminal according to this invention was devised in view of the above points. That is, the emergency message function must be used through a simple method which, however, helps increase erroneous operation or generation of emergency message out of fun. It is therefore an object of this invention to provide an electronic device having an emergency message function, which can be easily used but which induces little erroneous operation or generation of message out of fun. The invention further has an object of providing an insurance system useful for the electronic terminal.

To solve the above problems and to accomplish the desired object according to the electronic terminal of a first invention, a predetermined breakable portion which is part of the electronic terminal is intentionally broken by the user to generate an emergency message. To generate the emergency message, the user must break the electronic terminal; i.e., the user hesitates to use the emergency message function unless it is really urgent. Further, the breakable portion is so constituted that it can be broken requiring a certain degree of force, so that the breakable portion is not erroneously broken in a pocket or in a bag and that undesired emergency message is not generated. Further, the breakable portion is so designed that it can be easily discerned by the user, making it possible to easily generate the emergency message in case of an emergency.

Namely, an electronic terminal according to the first invention comprises:

- a predetermined breakable portion that can be intentionally broken by a user;
- break detector means for detecting the breakage of the breakable portion;
- first storage means storing predetermined data related to a place to be accessed;
- second storage means storing predetermined emergency data;
- radio communication means for connection to a network in a wireless manner; and
- emergency message means in which the break detector means detects the breakage when the breakable portion is intentionally broken by the user, the data related to a place to be accessed is read out from the first storage means, the emergency data is read out from the second storage means, and the emergency data is transmitted by the radio communication means to the place to be accessed.

Here, the predetermined breakable portion may be a portion of the housing of the electronic terminal, a hinge portion, an antenna cover, etc. The break detector means may be an electric circuit which is so constituted as to permit the flow of an electric current when the breakable portion is broken. In its simplest form, the breakable portion may be provided with a switch which is so constituted as to be turned on simultaneously with the user's attempt for breaking. The first storage means and the second storage means may be the existing RAMs or flush memories. They may be physically separated apart or may be physically the same part.

The predetermined data related to a place to be accessed is the data for making an access to a place to where the emergency communication is to be connected. The place to where the access be made in an emergency may be a police station, a security company, the user's home or an acquaintance's home. Depending upon the kind of emergency data, it may be a server on an internet or on a network of a particular corporate. Therefore, the data related to a place to be accessed is a telephone number, a fax number, an URL or e-main address for making access to the place that is to be accessed. It is further estimated that a plurality of places may be accessed in an emergency. It is therefore desired that the storage is capable of storing the data related to a plurality of places to be accessed. It is further desired that the emergency data includes one or more of voice message, text message, image data, position data and binary data, and that the emergency data is related to one or more places to be accessed. For example, the same voice message is transmitted to both the police station and the security company that are related to be the places to be accessed.

It is desired that the radio communication means is a cellular radio communication means. This is because, the mobile telephones of the cellular system have now been most widely used as radio communication means for making access to a suitable place such as the police station.

However, should other radio communication means such as bluetooth and wireless LAN develop in the future, they may be used as radio communication means. Therefore, the above network includes not only the public telephone network, internet and in-house network but also the local network such as bluetooth network. Further, a plurality of networks will have to be passed through to make an access to a desired place that is to be accessed. Therefore, the network often stands for a plurality of networks. It is further desired that the radio communication means is capable of changing the voice communication mode and the data communication mode over to each other. It is further desired that the electronic terminal according to the first invention has means for connection to the internet.

The electronic terminal according to the first invention further comprises:

third storage means for storing a predetermined software key; and emergency message means-locking means which permits the emergency message means to operate when the predetermined software key is stored in the third storage means.

The third storage means may be an existing RAM or a flush memory like the above first storage means and the second storage means. Further, the third storage means may be physically separate from the first and second storage means, or may be integral therewith. The software key is a program or a software used for the emergency message means-locking means. The emergency message means-locking means is the one which inhibits the use of the emergency message means unless the software key is installed in the electronic terminal.

By using the emergency message means-locking means, the dealers who sell the electronic terminal of the first invention can separately sell the emergency message function as an additional service. That is, only those persons who have purchased the emergency message function separately from the electronic terminal body are allowed to use the emergency message function by installing the software key in the electronic terminal. The dealers can offer the software key through the network.

The electronic terminal according to the first invention may further comprise:

image data obtaining means for obtaining image data; and image data storage means for storing, as the emergency data, the image data obtained by the image data obtaining means in the second storage means.

The image data obtaining means may be a camera device or a video camera device.

The electronic terminal according to the first invention may further comprise:

position data obtaining means for obtaining position data; and position data storage means for storing, as the emergency data, the position data obtained by the position data obtaining means in the second storage means.

The position data obtaining means may be a GPS device. When the radio communication means is of the cellular type, there can be utilized the position data transmitted from a ground station.

The electronic terminal according to the first invention has alarm sound generating means to generate an alarm sound when the break detector means has detected the breakage of a predetermined portion.

With the electronic terminal being constructed to generate an emergency message upon breaking a portion of it as contemplated by this invention, it is allowed to offer the emergency message function suppressing the chances of erroneous operation or generation of emergency message out of fun. However, since the electronic terminal will remain broken after the emergency message is issued, the users may hesitate to purchase the product.

In order to solve the above problem, a second invention provides an insurance system for compensating the electronic terminal of the first invention that is broken as a result of generating the emergency message.

That is, an insurance system according to the second invention comprises:

an electronic terminal of the first invention; and a computer system including:

means for connection to a network;

means for receiving predetermined insurance contract data;

means for transmitting the software key;

means for receiving predetermined emergency data;

means for receiving predetermined break confirmation data;

payment criterion judging means for judging whether a predetermined criterion for paying the insurance money is satisfied; and means for settling the predetermined insurance money.

Further, an insurance system according to the second invention comprises:

an electronic terminal of the first invention; and a program which works as:

means for connecting a computer system to a network;

means for receiving predetermined insurance contract data;

means for transmitting the software key;

means for receiving predetermined emergency data;

means for receiving predetermined break confirmation data;

payment criterion judging means for judging whether a predetermined requirement for paying the insurance money is satisfied; and insurance money settling means.

The insurance system requires the electronic terminal according to the first invention. Here, it is desired that the electronic terminal includes the third storage means for storing a predetermined software key, and an emergency message means-locking means which permits the emergency message means to operate when the predetermined software key is stored in the third storage means.

It is further desired that the computer system includes one or more computers.

It is further considered that the computer systems are in many cases installed in the insurance companies. Therefore, the network referred to here, in many cases, stands for an in-house network. Not being limited thereto only, however, the network may be any one such as an internet or a public telephone network, as a matter of course. The insurance contract data includes the address and name of the user who contracts the insurance, identifier label of the electronic terminal and contents of (the insurance contracted. The insurance contract data are, in many cases, input as electronic data after the user has contracted the insurance with the insurance company. Should the electronic signature develop in the future, however, it may become a general trend in that the user transmits the insurance contract data directly to the computer system by using the electronic terminal, and the computer system contracts the insurance by using the insurance contract data. Therefore, the insurance contract data includes not only the data after the insurance has been contracted but also those data of before the insurance is contracted.

The predetermined emergency data is the one that is transmitted when the electronic terminal according to the first invention uses the emergency message function. In this insurance system, it is desired that the emergency data includes the address and name of the user as well as an identification number of the electronic terminal. The predetermined break confirmation data is the one which proves that the emergency message by breaking a predetermined part of the electronic terminal was really needed, and stands for a content of a certificate for proving accident issued by the police. Though a certificate issued by the police is usually necessary for the payment of an insurance money, it is considered that the above confirmation is necessary from the standpoint of preventing the use of the insurance system out of fun. Accordingly, the user mails the certificate of accident issued by the police to the insurance company. The content of the certificate is then transformed into an electronic form by the insurance company and is input to the computer system. Or, a police station may have been registered as a data related to a place to be accessed in the emergency message means, and an attempt of access to the police over the telephone in case of emergency may be used instead of the certificate of accident. This is because few people may make an access to a police station out of fun. In this case, the computer system may be so constituted as to check the record of communication from a public telephone network and obtain the attempt as break confirmation data.

The payment criterion judging means judges whether a predetermined criterion for paying insurance money is satisfied. Usually, the criterion is judged by taking all of the insurance contract data, emergency data and break confirmation data into consideration. For example, it is judged whether the address and name of the user as well as the electronic terminal identification label included in the data are the same, and whether the break confirmation data is proving the necessity of emergency message. The payment criterion judgement means is offered as a software, takes out necessary data from the above various data stored as electronic data in the computer system, and renders a required judgement.

The insurance money settling means has a settling function such as transferring a predetermined insurance money from the insurance company to the user's bank account and recording a predetermined data. The computer system automatically settles the insurance money based upon the result judged by the payment criterion judging means.

DESCRIPTION OF THE PREFERRED EMBODIMENTS

Figure 1:
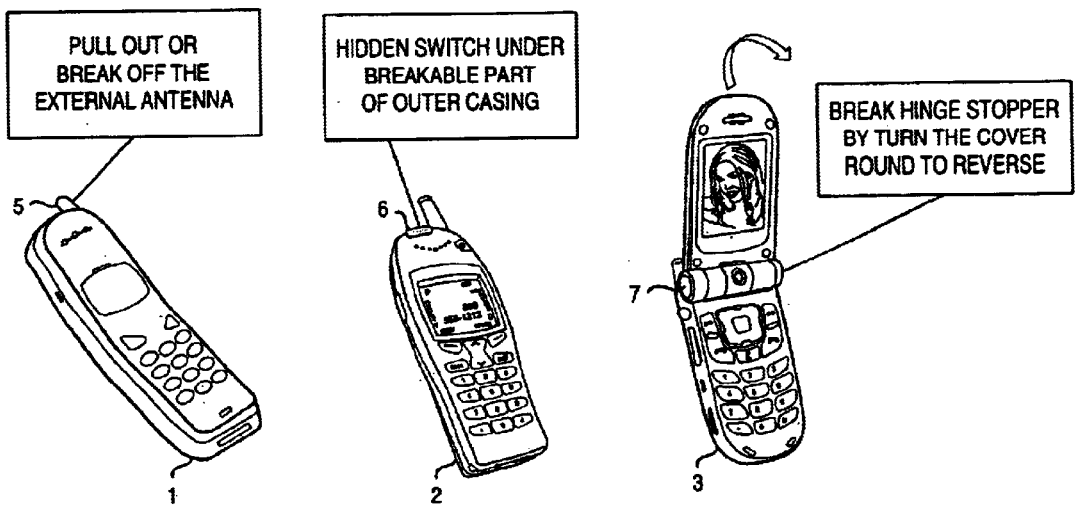
FIG. 1 is a view illustrating electronic terminals according to a first invention and portions of the electronic terminals that can be broken for generating an emergency message.

An electronic terminal and an insurance system according to embodiments of the invention will now be described in detail with reference to FIGS. 1 to 4. FIG. 1 is a view illustrating electronic terminals according to a first invention and portions of the electronic terminals that can be broken for generating an emergency message, FIG. 2 is a diagram illustrating the constitution of a device including internal circuits in the electronic terminal according to the first invention, FIG. 3 is a diagram illustrating an operation for generating an emergency message in the electronic terminal according to the first invention, and FIG. 4 is a diagram illustrating a flow of an insurance system according to a second invention.

FIG. 1 is a view illustrating electronic terminals according to a first invention and portions of the electronic terminals that can be broken for generating an emergency message, wherein reference numerals 1 to 3 denote electronic terminals according to the first invention. The electronic terminal according to the first invention, most desirably, has a function of a portable data terminal such as a portable telephone or a PDA. The electronic terminal, however, needs not necessarily be in a portable form. The electronic terminal 1 generates an emergency message when its antenna cover 5 is broken, the electronic terminal 2 emits an emergency message when a portion 6 of the housing is broken, and the electronic terminal 3 generates an emergency message when a hinge portion 7 thereof is broken. When the antenna cover 5 is to be broken, it is important that the cover only is broken but the antenna body is not broken. This can be done by using a flexible material as the antenna and using a hard material as the cover. Other portions to be broken may be a display portion such as LCD panel that can be crushed, an external antenna or the like portions.

Figure 2:
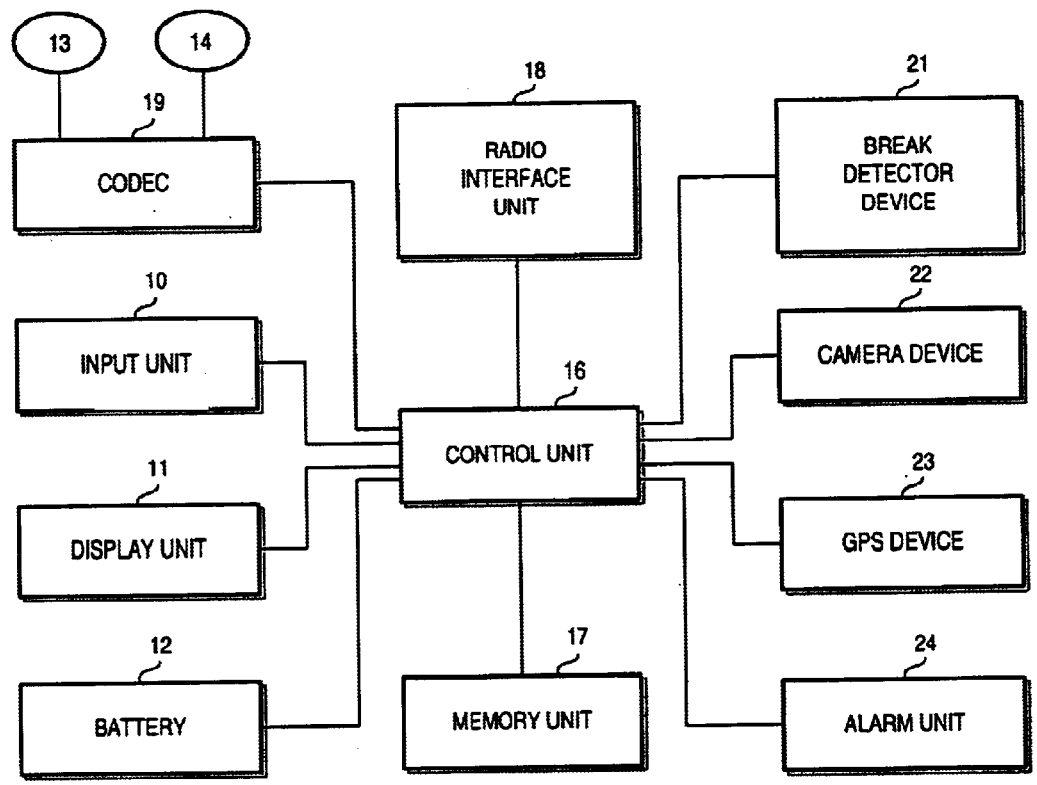
FIG. 2 is a diagram illustrating the constitution of a, device including internal circuits in the electronic terminal according to the first invention.

FIG. 2 is a view illustrating the constitution of a device including internal circuits in the electronic terminal according to the first invention. The electronic terminal has a device casing or a housing (not shown) in which a variety of constituent members are contained such as an input unit 10 like key buttons, a display unit 11 like an LCD panel, a battery unit (power source pack) 12, a microphone 13 and a speaker 14. Further, the constituent elements related to the circuitry of the electronic device are a control unit 16, a memory unit 17, a radio interface unit 18, a codec 19 and the like. These constituent circuits and the constituent elements have been technically well known. Here, the memory unit 17 is used as first storage means for storing predetermined data related to a place to be accessed, as second storage means for storing predetermined emergency data and as third storage means for storing a predetermined program. Further, the electronic device is equipped with a break detector device 21 for detecting the breakage of the predetermined portion. Provision is further made of a camera device 22 including lens, CCD, DSP, etc., a GPS device 23 and an alarm unit 24, which have also been technically well known.

Figure 3:
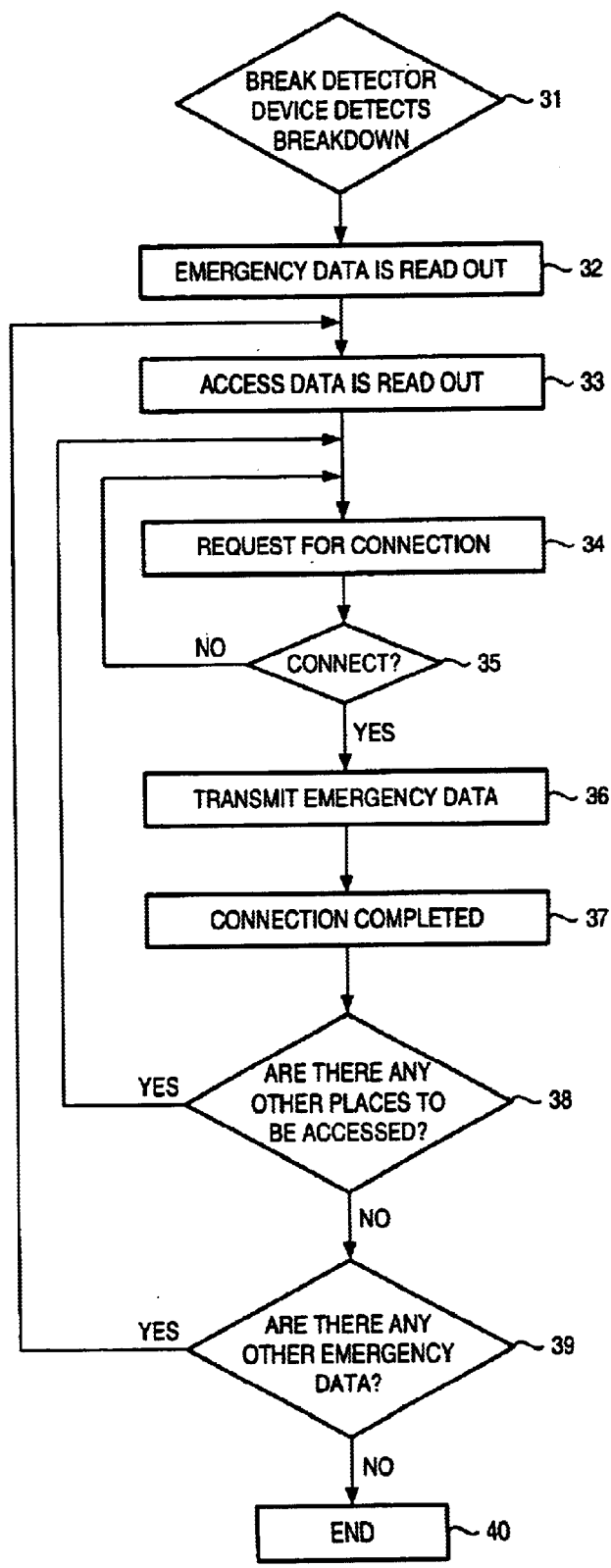
FIG. 3 is a diagram illustrating an operation for generating an emergency message in the electronic terminal according to the first invention.
Figure 4:
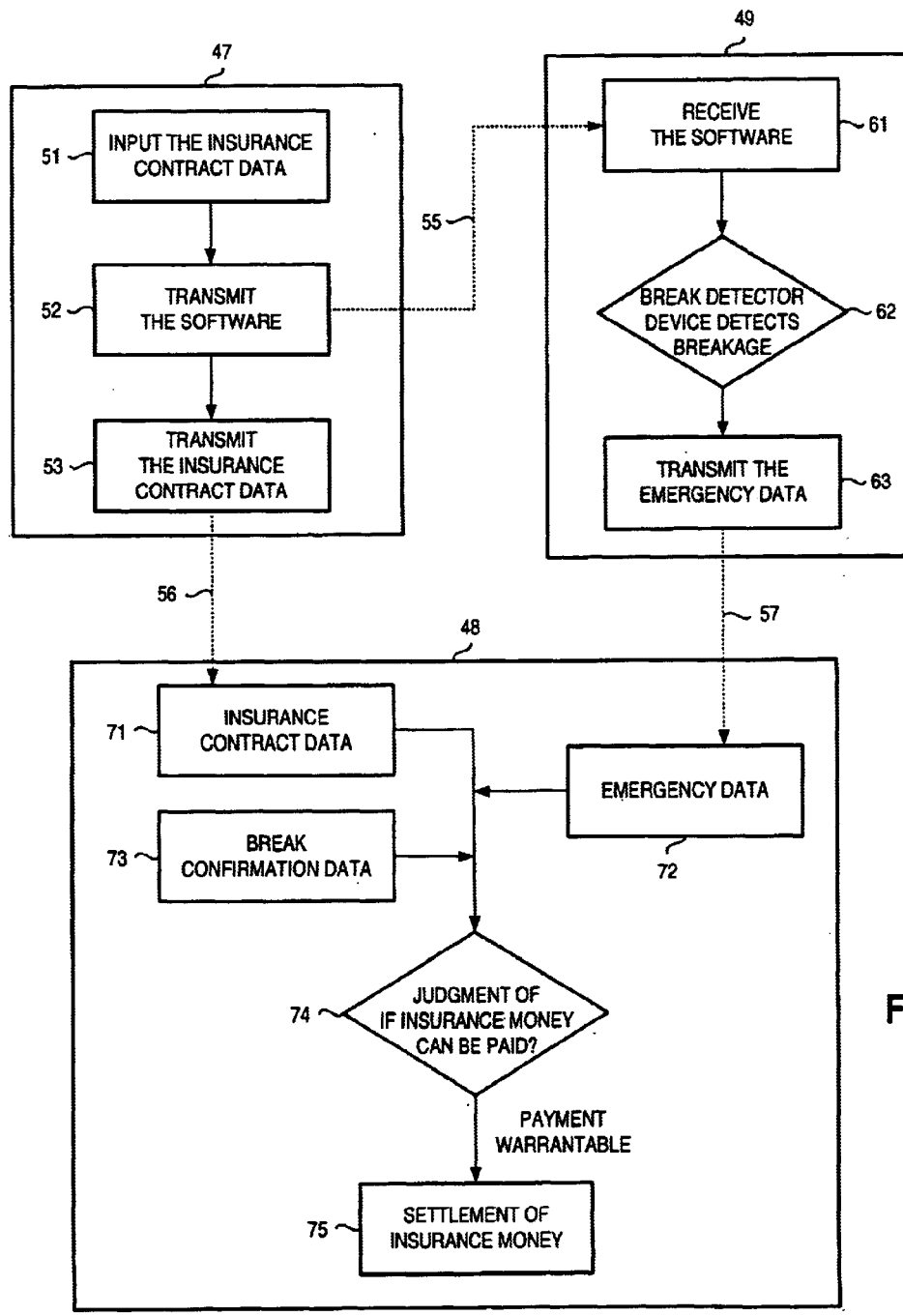
FIG. 4 is a diagram illustrating a flow of an insurance system according to a second invention.

FIG. 3 is a diagram illustrating an operation for generating an emergency message in the electronic terminal according to the first invention. When the break detector device 21 detects the breakage at a predetermined potion at step 31, a predetermined emergency data is read out from the memory unit 17 at step 32, access data related to the emergency data is read out from the memory unit 17 at step 33, connection is made to a place to be accessed at step 34, connection to the place to be accessed is confirmed at step 35, emergency data is transmitted at step 36, and connection is completed at step 37. It is judged at step 38 whether there are any other places to be accessed in relation to the emergency data. If there are any other places, the routine returns back to step 34 to make a connection again. If there is no other place, it is judged at step 39 if there are any other emergency data. If there are any other emergency data, the routine returns back to step 33 to read the access data in relation to other emergency data.

The emergency data may be voice message or text message that has been provided in advance, or may be image data or position data. It is further desired that there are included the data related to the address and name of the user as well as the identification label of the electronic terminal. When the electronic terminal is equipped with the camera device 22, a photograph may be taken at regular time intervals or a photograph may be taken when the break detector device 21 has detected the breakage at a predetermined portion to be stored in the memory 17 and may be transmitted as emergency data. When the electronic terminal is equipped with the position data obtaining means, the position data may be stored in the memory 17 at suitable time intervals or the position may be measured being linked to the break detector device 21, and the measured position data may be stored in the memory 17 and may be transmitted as emergency data.

The access data of the place to be accessed differs depending upon the kind of the emergency data. When the emergency data is a voice message, the access data may preferably be a telephone number of a police station, of a security company, of the user's home or of an acquaintance's home. When the emergency data is a text message, image data or position data, it is considered that the access data is preferably the e-mail address or URL of the place to be accessed. To cope with a plural kinds of emergency data, therefore, it is desired that the radio interface unit 18 has a function for changing the voice communication mode and the data communication mode over to each other.

FIG. 4 is a diagram illustrating a flow of an insurance system according to a second invention. This embodiment includes, as a computer system, a first server 47 and a second server 48, as well as an electronic terminal 49 having an emergency message function.

The user who is going to use the insurance, first, contracts the insurance with the insurance company. The content of contract is transformed into electronic data and is input at step 51 to the first server 47 as insurance contact data. The insurance contract data includes data related to the address and name of the user as well as an identification label of the electronic terminal. The first server 47 at step 52 transmits a predetermined software to the electronic terminal through a network 55 to enable the use of the emergency message function of the electronic terminal. At the same time, the first server at step 53 transmits the insurance contact data to the second server of the insurance system according to the second invention through a network 56.

When the electronic terminal that has received, at step 61, the predetermined software generates an emergency message in an emergency case as a result of breaking the predetermined portion at step 62, the data including the identification label of the electronic terminal as well as the address and name of the user as the emergency data are transmitted to the second server at step 63.

When the second server in the insurance system according to the second invention receives at step 72 the emergency data through a network 57 and further receives at step 73 the break confirmation data, then, the payment criterion judging means judges at step 74 whether the insurance money be paid relying upon the received data in combination with the insurance contract data that has been received already. The break confirmation data is, for example, a certificate of accident issued by a police station, and is transformed into electronic data and is input to the second server. The break confirmation data must include identification label of the electronic terminal, address and name of the user, and the data that proves the use of the emergency message function urged truly by the emergency. The payment criterion judging means, too, has been realized in the second server by the software application, and automatically judges whether the payment of insurance money is warrantable relying upon the above data and the data representing the payment criterion of the insurance company. When warrantable, the insurance money is paid at step 75 through the insurance money settling means.

Here, the networks 55, 56 and 57 are in-house network, internet, etc. which may be of different kinds or of the same kind. Further, though not diagramed, the insurance contract data are input at step 51 and the break confirmation data are input at step 73 through the network such as in-house network or the like network.

The above embodiments are only to illustrate this invention, and it should be noted that the electronic terminal and the insurance system according to the invention can be constituted in any other mode.

As described above, the first invention provides an electronic terminal having an emergency message function which can be easily used little inducing erroneous operation or operation out of fun. Further, the second invention provides an insurance system which insures the payment of a predetermined amount of money for the electronic terminal that was broken as a result of using the emergency message function of the electronic terminal of the first invention, so that the users will not hesitate to purchase the electronic terminals of the first invention worrying about that the electronic terminals are destined to be broken. Further, the insurance system according to the second invention may not only be to compensate the electronic terminal that is broken but can be expanded to compensate the damages the user has suffered due to emergency situation that caused the issuance of the emergency message.

What is claimed is:

1. An electronic terminal comprising:
   a predetermined breakable portion that can be intentionally broken by a user;
   break detector means for detecting the breakage of the breakable portion;
   first storage means storing predetermined data related to a place to be accessed;
   second storage means storing predetermined emergency data;
   radio communication means for connection to a network in a wireless manner;
   emergency message means in which the break detector means detects the breakage when the breakable portion is intentionally broken by the user, the data related to a place to be accessed is read out from the first storage means, the emergency data is read out from the second storage means, and the emergency data is transmitted by the radio communication means to the place to be accessed.

2. An electronic terminal according to claim 1, further comprising:
   third storage means for storing a predetermined software key; and
   emergency message means-locking means which permits the emergency message means to operate when the predetermined software key is stored in the third storage means.

3. An electronic terminal according to claim 2, wherein there are a plurality of places to be accessed, the data related to the places to be accessed include one or more of telephone number, fax number and URL or e-mail address, and the emergency data includes one or more of voice message, text message, image data, position data and binary data, the emergency data being related to one or more places to be accessed.

4. An electronic terminal according to claim 3, further comprising:
position data obtaining means for obtaining position data; and
position data storage means for storing, as the emergency data, the position data obtained by the position data obtaining means in the second storage means.

5. An electronic terminal according to claim 4, further comprising:
image data obtaining means for obtaining image data; and
image data storage means for storing, as the emergency data, the image data obtained by the image data obtaining means in the second storage means.

6. An electronic terminal according to claim 4, further comprising alarm sound generating means to generate an alarm sound when the break detector means has detected the breakage of a predetermined portion.

7. An electronic terminal according to claim 4, further comprising means for connection to an internet.

8. An electronic terminal according to claim 4, wherein the radio communication means is the one of the cellular system.

9. An electronic terminal according to claims 4, wherein the radio communication means has communication mode change-over means for changing over the voice communication mode and the data communication mode over to each other.

10. An insurance system comprising: an electronic terminal having: a predetermined breakable portion that can be intentionally broken by a user; break detector means for detecting the breakage of the breakable portion; first storage means storing predetermined data related to a place to be accessed; second storage means storing predetermined emergency data; radio communication means for connection to a network in a wireless manner; emergency message means in which the break detector means detects the breakage when the breakable portion is intentionally broken by the user, the data related to a place to be accessed is read out from the first storage means, the emergency data is read out from the second storage means, and the emergency data is transmitted by the radio communication means to the place to be accessed; third storage means for storing a predetermined software key; and emergency message means-locking means which permits the emergency message means to operate when the predetermined software key is stored in the third storage means; and
a computer system including:
means for connection to a network;
means for receiving predetermined insurance contract data;
means for transmitting the software key;
means for receiving predetermined emergency data;
means for receiving predetermined break confirmation data;
payment criterion judging means for judging
whether a predetermined criterion for paying the insurance money is satisfied; and
means for settling the predetermined insurance money.

11. An insurance system comprising:
an electronic terminal having: an electronic terminal having: a predetermined breakable portion that can be intentionally broken by a user; break detector means for detecting the breakage of the breakable portion; first storage means storing predetermined data related to a place to be accessed; second storage means storing predetermined emergency data; radio communication means for connection to a network in a wireless manner; emergency message means in which the break detector means detects the breakage when the breakable portion is intentionally broken by the user, the data related to a place to be accessed is read out from the first storage means, the emergency data is read out from the second storage means, and the emergency data is transmitted by the radio communication means to the place to be accessed; third storage means for storing a predetermined software key; and emergency message means-locking means which permits the emergency message means to operate when the predetermined software key is stored in the third storage means; and
a program which works as:
means for connecting a computer system to a network;
means for receiving predetermined insurance contract data;
means for transmitting the software key;
means for receiving predetermined emergency data;
means for receiving predetermined break confirmation data;
payment criterion judging means for judging whether a predetermined criterion for paying the insurance money is satisfied; and
insurance money settling means.

12. An insurance system according to claim 10 or 11, wherein the computer system includes one or more computers.

* * * * *